A. T. DAWSON & G. T. BUCKHAM.
FIRING GEAR OF BREECH LOADING ORDNANCE.
APPLICATION FILED OCT. 2, 1909.
1,087,219.
Patented Feb. 17, 1914.
5 SHEETS—SHEET 1.
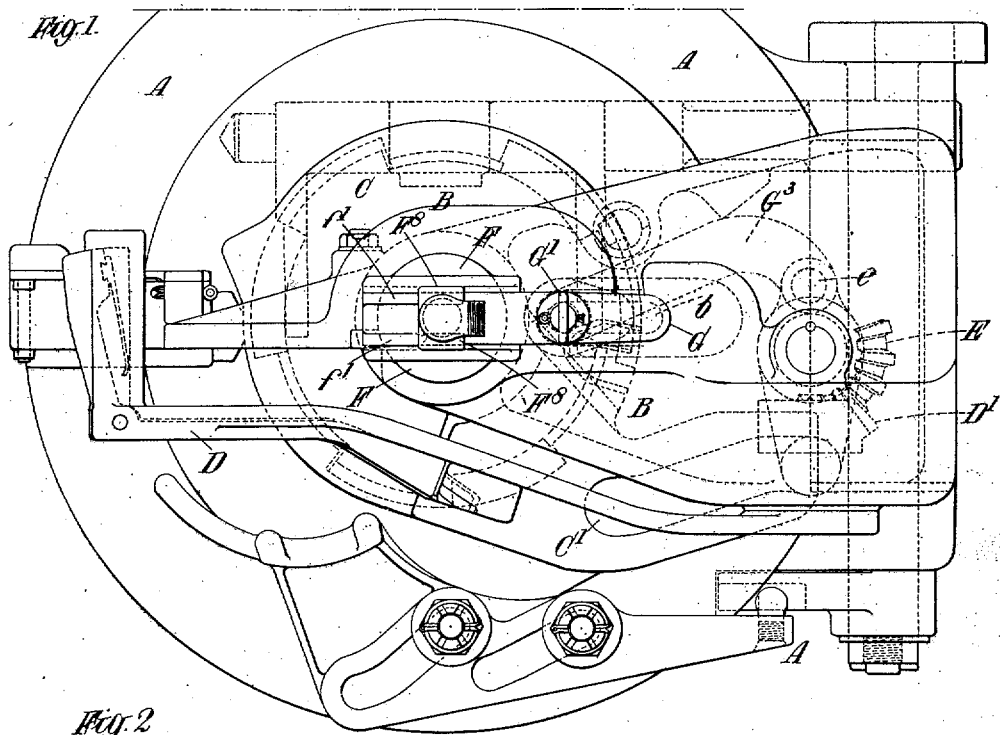
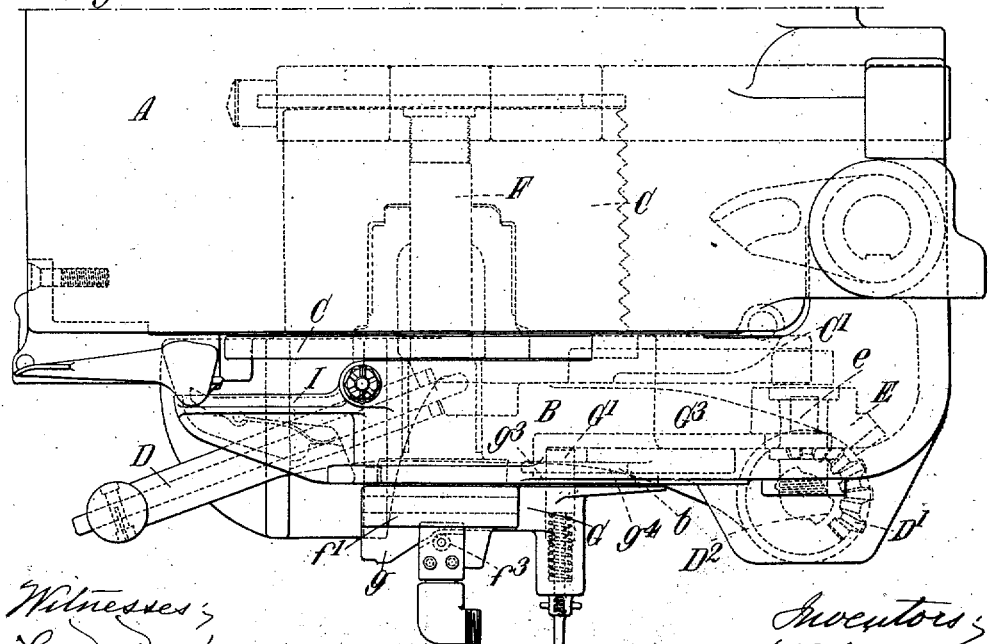

A. T. DAWSON & G. T. BUCKHAM.
FIRING GEAR OF BREECH LOADING ORDNANCE.
APPLICATION FILED OCT. 2, 1909.
1,087,219.
Patented Feb. 17, 1914.
5 SHEETS—SHEET 2.
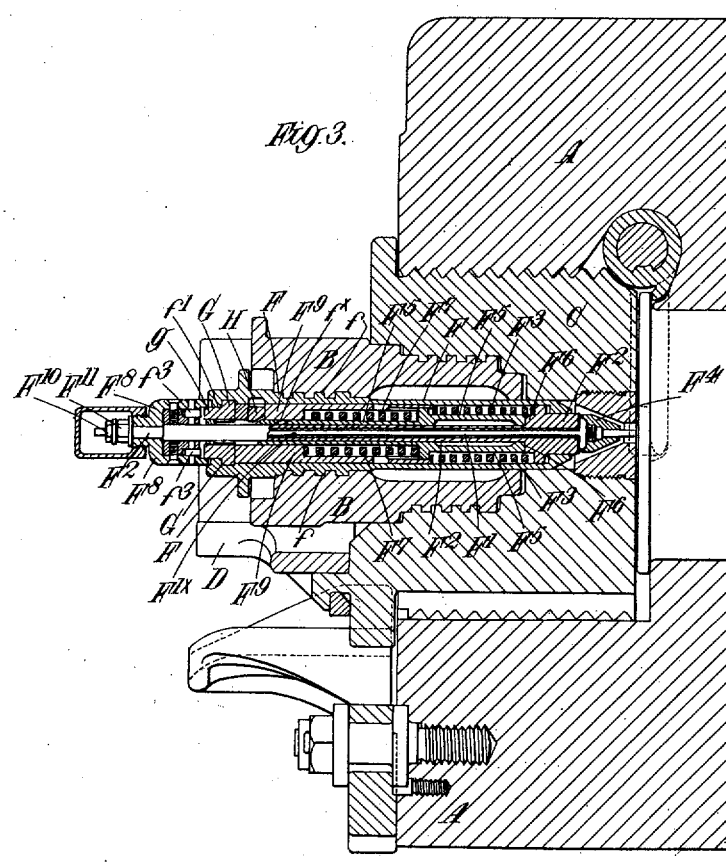

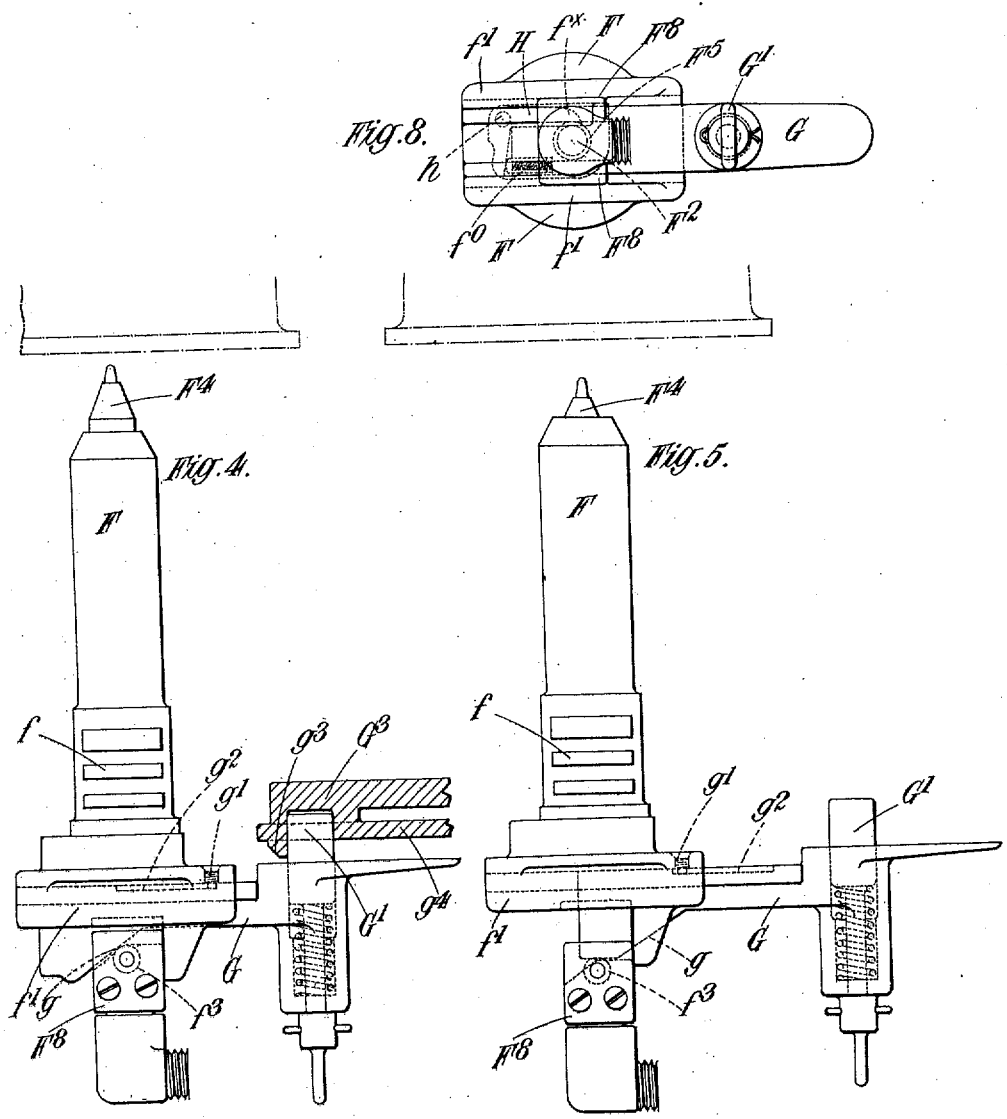

A. T. DAWSON & G. T. BUCKHAM.
FIRING GEAR OF BREECH LOADING ORDNANCE.
APPLICATION FILED OCT. 2, 1909.
1,087,219.
Patented Feb. 17, 1914.
5 SHEETS—SHEET 4.
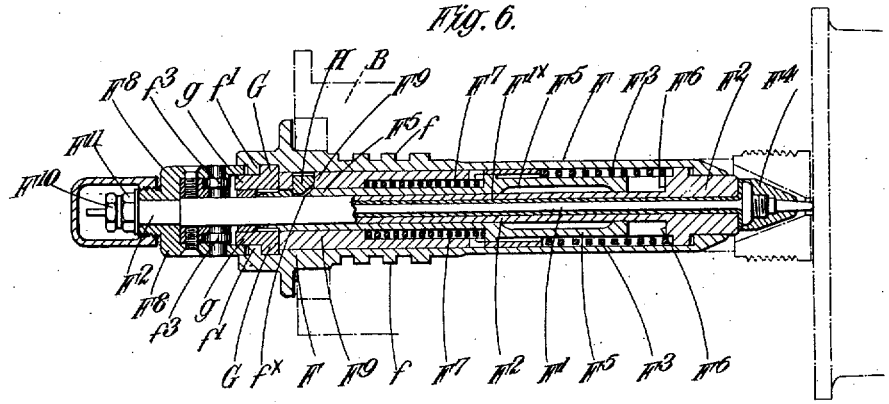
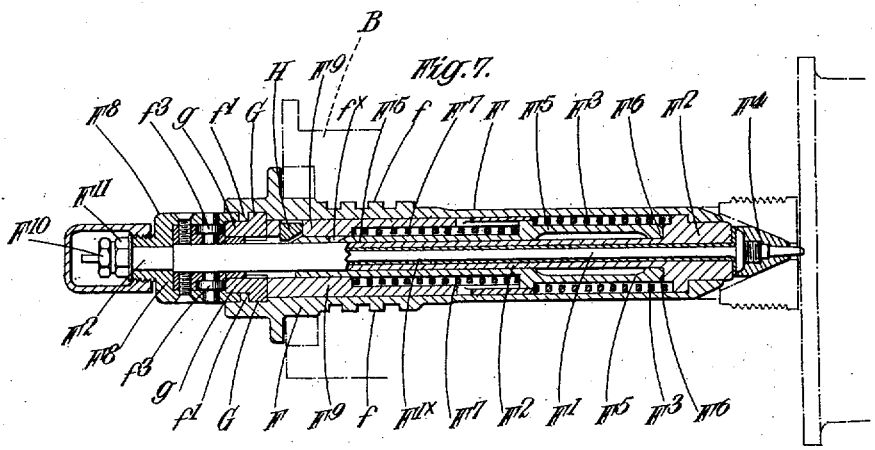

A. T. DAWSON & G. T. BUCKHAM.
FIRING GEAR OF BREECH LOADING ORDNANCE.
APPLICATION FILED OCT. 2, 1909.
1,087,219.                    Patented Feb. 17, 1914.
                                   5 SHEETS—SHEET 5.
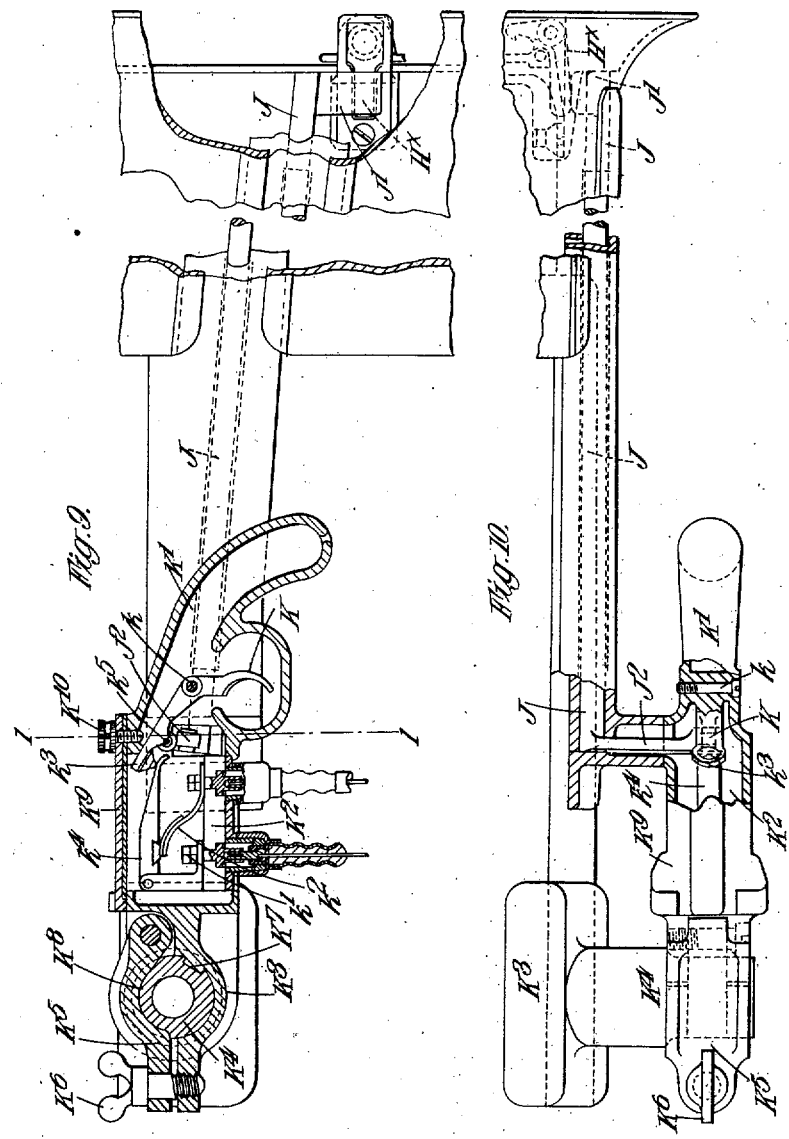

UNITED STATES PATENT OFFICE.

ARTHUR TREVOR DAWSON AND GEORGE THOMAS BUCKHAM, OF WESTMINSTER, LONDON, ENGLAND, ASSIGNORS, BY MESNE ASSIGNMENTS, TO VICKERS, LIMITED, OF WESTMINSTER, ENGLAND.

FIRING-GEAR OF BREECH-LOADING ORDNANCE.

1,087,219.  Specification of Letters Patent.  Patented Feb. 17, 1914.

Application filed October 2, 1909. Serial No. 520,712.

*To all whom it may concern:*

Be it known that we, ARTHUR TREVOR DAWSON and GEORGE THOMAS BUCKHAM, subjects of the King of Great Britain, both residing at 32 Victoria street, Westminster, in the county of London, England, have invented certain new and useful Improvements Relating to the Firing-Gear of Breech-Loading Ordnance, of which the following is a specification.

This invention relates to firing gear of the kind in which there is employed a combined electric and percussion lock adapted for use with quick firing guns. In such locks the electric needle (surrounded by a sheath of insulating material) lies in contact with the primer and the gun can be fired electrically while a spring controlled hammer is adapted to be released to strike the electric needle when the gun is to be fired mechanically, the percussive action and the electric action being quite independent of each other.

The chief object of the invention is to so construct and arrange a combined electric and percussion lock that the firing will be effected by an electric action and a percussive action, these actions occurring in such rapid succession as to be practically simultaneous, and thus reducing the liability of a misfire.

According to our invention the lock comprises an insulated electric needle surrounded by a sheath controlled by an independent spring, which for sake of distinction may be termed the electric spring, the said needle being secured to the sheath by an insulated nut or bush in the usual manner. Surrounding the said sheath is a striker which in its forward movement is adapted to act upon a shoulder on the sheath. This striker is also controlled by an independent spring which may be termed the percussion spring. The parts are so arranged that the needle with its sheath and the surrounding striker are retracted together during the cocking operation. At the end of the cocking operation the said striker is held in its retracted position by a suitable retaining piece or trigger but the needle and its sheath are permitted to gently advance under the action of the electric spring in order to bring the point or nose of the needle into contact with the primer. The said retaining piece or trigger is so arranged with respect to the hand actuated trigger which may be of the pistol grip type, that when the latter is operated to fire the gun the circuit through the electric needle is completed and the percussion striker is released by its retaining piece or trigger, thereby permitting the striker to fly forward under the influence of the percussion spring and by impinging on the shoulder of the needle sheath, cause the needle to strike the primer to effect the firing percussively in the event of the electric firing having failed.

In order that our said invention may be clearly understood and readily carried into effect we will describe the same more fully with reference to the accompanying drawings, in which:—

Figure 1 is a front elevation, and Fig. 2 a plan of breech mechanism provided with our improved firing gear. Fig. 3 is a vertical longitudinal section taken through the center of the electric and percussion lock. Figs. 4 and 5 are plans of the firing gear detached from the breech mechanism and shown in the position the parts assume when the needle is partly retracted and when it is fully retracted. Figs. 6 and 7 are longitudinal sections of the electric and percussion lock, the former figure showing the parts in the cocked position and the latter figure showing the parts in the fired position. Fig. 8 is an end view of Fig. 7. Fig. 9 is a sectional elevation of the trigger mechanism, and Fig. 10 is a sectional plan of the same.

Like letters of reference indicate similar parts in all the figures.

A is a breech end of the gun; B the swinging carrier; C the breech screw; D the breech actuating hand lever.

E is the crank pinion by means of which the breech screw is angularly displaced in its locking and unlocking movements through the intervention of the usual slotted arm $C'$ on the breech screw, the said crank pinion receiving its motion from a pinion $D'$ on the axle $D^2$ of the hand lever D.

F is the retaining case of the improved electric and percussion lock and G is the cocking and safety slide that receives its motion from the crank pinion E and operates on the striker and firing needle as hereinafter described. Contained centrally within the retaining case F is the needle $F'$ which is surrounded by the insulating bush $F'^x$ this latter in turn being protected by a steel sheath F² and the controlling or electric spring F³, the said needle having the usual insulated nut or head F⁴ and the nut F¹⁰ by which it is secured to its sheath. The sheath is secured to the sleeve F⁸ by means of a shoulder on the sheath and the nut F¹¹. The nuts F¹⁰ and F¹¹ are insulated by leather washers. F⁵ is the striker which is hollow and surrounds the said sheath; it is adapted to act upon the shoulder F⁶ of the sheath under the influence of the controlling or percussion spring F⁷. The said retaining case F is mounted in the swinging carrier B, and retained in place therein in the usual manner by the interrupted fillets or segments $f$. The cocking and safety slide G works in guides $f'$ formed at the rear or outer end of the retaining case F, the said slide being formed with inclines $g$ that engages with friction rollers $f^3$ carried by the sleeve F⁸ mounted on the outer end of the needle sheath F². The said slide G is also provided with a spring guide bolt G' which engages with a suitable part of the breech mechanism for operating the slide when the mechanism is actuated in opening and closing the breech. In the example shown the said bolt engages with a hole in one end of a link G³ whose other end is hinged at $e$ to the crank pinion E. The end of the link with which the said bolt engages, slides in a transverse groove $b$ in the carrier B. On the left side of the guide bolt hole is a short rearward projection $g^3$ over which the guide bolt cannot pass, thus preventing it from being inserted behind the boss of the link; an extension $g^4$ toward the right also serves a similar purpose when withdrawing the slide by hand when the breech mechanism is in the closed position. The projection $g^3$ also renders it impossible to return the slide to the firing position while the breech mechanism is in the open position. The hinged connection of the said link G³ with the crank pinion lies in a position to give rapid withdrawal of the cocking and safety slide during the idle movement of the crank pinion in relation to the breech screw, thus insuring the withdrawal of the needle before any unlocking action takes place on the breech screw.

H is the retaining piece or trigger which in the example shown is of bell crank form and pivoted at $h$ (Fig. 8) in the percussion spring case F⁹, one arm engaging with a notch $f^x$ in the striker under the influence of a spring plunger $f^0$ (Fig. 8) and the other arm engaging with the firing lever I (Fig. 2) which is pivotally arranged in the carrier and adapted to be operated by a suitable tripping cam which is under the control of a releasing lever H˟ in a similar manner to that set forth in the specification of our applications for Patent, Serial Nos. 484,746 and 484,747. The mechanism for actuating the releasing lever H˟ may be of the kind illustrated by Figs. 9 and 10 in which K' is a pistol grip forming the rear portion of a hollow casing K² which contains the electric contacts $k'$ $k^2$ and which is carried by a bracket K³ attached to the gun cradle. The forward portion of the casing is connected with a neck K⁴ on the said bracket by means of a hinged jaw or clamp K⁵ provided with a suitable clamping screw K⁶. The said casing K² is prevented from moving around the bracket by a key K⁷ engaging with the neck of the bracket, endwise movement of the said casing on the neck being prevented by a segmental key K⁸ on the hinged jaw or clamp. The trigger K is contained in the pistol grip K' and is provided with an insulated button $k^3$ through which the contact lever $k^4$ is depressed for closing the electric contacts to fire the gun. The trigger is also provided with a roller $k^5$ through which is actuated the forward arm J² of the rocking firing spindle J that conveys motion to the releasing lever H˟ to liberate the trigger H and fire the gun as above described. All of the internal parts are readily accessible for inspection or adjustment from the top of the casing K² which is normally closed by a cover plate K⁹ and securing screw K¹⁰. The assembled parts of the lock are held in place in the retaining case F, by the cocking and safety slide G which is situated between the percussion spring case F⁹ and the sleeve F⁸. The movement of the slide G may be limited by a screw $g'$ (Figs. 4 and 5) carried by the retaining case and engaging with a groove $g^2$ in the slide.

When the breech is being opened after firing, the first movement of the breech actuating hand-lever, prior to angularly displacing the breech screw to unlock it, draws the aforesaid link G³, and with it the safety slide G, across the face of the carrier. This movement brings the inclines $g$ on the slide immediately into contact with the rollers $f^3$ on the sleeve F⁸ and withdraws the electric needle F' and sheath F² together with the percussion striker F⁵, away from the primer into the safety position (Fig. 4). Further movement of the hand lever completely cocks the striker while unlocking the breech screw. When the percussion striker F⁵ and electric needle F' are fully cocked, the aforesaid trigger H engages with the notch $f^x$ in the striker, and retains it cocked until the said trigger is released by the firing lever I as above described. When the breech is closed and angular displacement is being imparted to the breech screw for locking it, the sleeve F⁸ together with the electric needle F' and its sheath F², moves forward under the influence of the electric spring F³, until (after the breech screw is completely locked) the said needle rests on the primer (Fig. 6), the percussion striker F⁵ meanwhile being still retained cocked by the trigger H. This forward movement of the electric needle takes place in a gentle manner owing to the action of the inclines $g$ of the slide on the rollers $f^3$ of the sleeve $F^8$. The lock is then in condition for effecting the electric and percussion firing. When the hand-actuated trigger K is operated, the electric circuit through the electric needle F' is instantly completed, and immediately afterward the percussion striker $F^5$ is released by the said bell crank trigger H which is tripped by the said firing lever I acting under the influence of the tripping cam. On its release the said striker, by impinging on the shoulder $F^6$ of the sheath, causes the needle to strike the primer, thereby firing percussively in the event of the electric firing having failed.

In order to detach the lock it is only necessary, when the breech mechanism is open, to withdraw the guide bolt G' from engagement with its link $G^3$ and turn the complete lock through a quarter revolution, the bolt passing through a suitable dismantling groove in the carrier. The fillets or segments $f$ on the retaining case will then be released from those on the carrier and the entire lock can be withdrawn. To detach the lock when the breech mechanism is closed, the striker must be first cocked by hand, the guide bolt G' then withdrawn, and the safety slide operated as already described.

The improved electric and percussion lock possesses the advantages that it is simple in construction, its parts can be assembled with facility, and its safety is assured by reason of the fact that the needle point is about one fifth of an inch from the primer before the breech screw is moved. A further advantage is that in assembling the parts, when the breech is closed, the needle point cannot reach the primer until the safety slide is in its firing position, and that the safety slide, being indispensable to the working of the lock cannot be left out of place in assembling.

What we claim and desire to secure by Letters Patent of the United States is:—

1. In firing gear for ordnance, the combination of an insulated electric needle, a spring controlling the same, a percussion striker, a single manually actuated device, means operated by said device for closing an electric circuit through the needle, means also operated by said device for causing the striker to fire the gun percussively immediately after the closing of the electric circuit through the needle, and a sliding member for retracting said needle and striker and for permitting a gentle advance of the needle into contact with the primer.

2. In firing gear for ordnance, the combination of an insulated electric needle, a spring controlling the same, a percussion striker, a spring controlling said striker, a single manually actuated device, means operated by said device for closing an electric circuit through the needle, means also operated by said device for releasing the striker immediately after the closing of the electric circuit through the needle, and a sliding member for retracting said needle and striker and for permitting a gentle advance of the needle into contact with the primer.

3. In firing gear for ordnance, the combination of an insulated electric needle, a spring controlling the same, a shoulder on said needle, a percussion striker surrounding said electric needle, a spring controlling the striker to cause it to impinge on the shoulder of the electric needle, a single manually actuated device, means operated by said device for closing an electric circuit through the needle, means also operated by said device for releasing the striker immediately after the closing of the electric circuit through the needle, and a sliding member for retracting said needle and striker and for permitting a gentle advance of the needle into contact with the primer.

4. In firing gear for ordnance, the combination of a spring controlled electric needle, a spring controlled percussion striker, a sliding member for retracting said needle and striker and for permitting a gentle advance of the needle into contact with the primer, means for holding the striker retracted, a single manually actuated device, means operated by said device for closing an electric circuit through the needle, and means also operated by said device for releasing the striker immediately after the closing of the electric circuit through the needle.

5. In firing gear for ordnance, the combination of a spring controlled electric needle, a spring controlled percussion striker, a cocking and safety slide for retracting said needle and striker and for permitting a gentle advance of the needle into contact with the primer, means for holding the striker retracted, a single manually actuated device, means operated by said device for closing an electric circuit through the needle, and means also operated by said device for releasing the striker immediately after the closing of the electric circuit through the needle.

6. In firing gear for ordnance, the combination of a spring controlled electric needle, a spring controlled percussion striker, a cocking and safety slide, inclines thereon for retracting said needle and striker and permitting a gentle advance of said needle into contact with the primer, means for holding the striker in the retracted position, a single manually actuated device, means operated by said device for closing an electric circuit through the needle, and means also operated by said device for releasing the striker immediately after the closing of the electric circuit through the needle.

7. In firing gear for ordnance, the combination of a spring controlled electric needle, a spring controlled percussion striker, a sheath surrounding said electric needle, a sleeve mounted on said sheath, friction rollers carried by said sleeve, a cocking and safety slide, inclines thereon engaging with said rollers for retracting the electric needle and striker and permitting a gentle advance of the said needle into contact with the primer, means for holding the striker in the retracted position, a single manually actuated device, means operated by said device for closing an electric circuit through the needle, and means also operated by said device for releasing the striker immediately after the closing of the electric circuit through the needle.

8. In firing gear for ordnance, the combination of a spring controlled electric needle, a spring controlled percussion striker, a cocking and safety slide for retracting the said needle and striker and for permitting a gentle advance of the needle into contact with the primer, a lever for retaining the said striker in the retracted position, a single manually actuated device, means operated by said device for closing an electric circuit through the needle, and means also operated by said device for releasing the striker immediately after the closing of the electric circuit through the needle.

9. In firing gear for ordnance, the combination of a spring controlled electric needle, a spring controlled percussion striker, a cocking and safety slide for retracting the said needle and striker and for permitting a gentle advance of the needle into contact with the primer, a slot formed in said striker, a pivoted lever engaging in said slot to hold the striker in the retracted position, a single manually actuated device, means operated by said device for closing an electric circuit through the needle, and means also operated by said device for releasing the pivoted lever immediately after the closing of the electric circuit through the needle.

10. In firing gear for ordnance, the combination of a spring controlled electric needle, a spring controlled percussion striker, a cocking and safety slide for retracting the said needle and striker and for permitting a gentle advance of the needle into contact with the primer, a slot formed in said striker, a pivoted lever engaging in said slot to hold the striker in the retracted position, a single manually actuated trigger, means operated by said trigger for closing an electric circuit through the needle, and means also operated by said trigger for releasing the pivoted lever from the striker immediately after the closing of the electric circuit through the needle.

In testimony whereof we affix our signatures in presence of two witnesses.

ARTHUR TREVOR DAWSON.
GEORGE THOMAS BUCKHAM.

Witnesses:
HENRY KING,
ALFRED PEAKS.

Copies of this patent may be obtained for five cents each, by addressing the "Commissioner of Patents, Washington, D. C."